United States Patent Office 3,481,918
Patented Dec. 2, 1969

3,481,918
QUATERNIZED PHENYLAZO-PYRIMIDINE DYES
James M. Straley and John G. Fisher, Kingsport, Tenn., assignors to Eastman Kodak Company, Rochester, N.Y., a corporation of New Jersey
No Drawing. Filed Feb. 16, 1967, Ser. No. 616,501
Int. Cl. C09b 29/24, 29/36
U.S. Cl. 260—154                8 Claims

ABSTRACT OF THE DISCLOSURE

Cationic monoazo compounds prepared by quaternizing a phenyl-azo-pyrimidine compound are useful as dyes for acrylic, modacrylic, and acid-modified polyester textile materials. The monoazo compounds possess improved tinctorial power and exhibit excellent fastness properties.

---

This invention relates to certain novel azo compounds and, more particularly, to azo compounds containing a pyrimidino group which are useful as dyes for acrylic, modacrylic and acid-modified polyester textile materials.

The novel azo compounds of the invention have the general formula

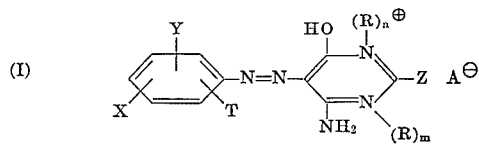

(I)

wherein:
X represents hydrogen, alkyl, alkoxy, halogen, nitro, pyrrolidinono; succinimido, or alkanoylamino;
Y represents hydrogen, alkyl, alkoxy, halogen, nitro, or alkanoylamino;
T represents hydrogen, alkyl, alkoxy, or halogen;
Z represents hydroxy or amino;
R represents lower alkyl or benzyl;
$n$ and $m$ each represent 0 or 1, the sum of $n$ and $m$ being 1; and
A represents an anion.

The novel compounds of the invention give yellow to orange dyeings exhibiting excellent fastness properties when applied to acrylic, modacrylic, and acid-modified polyester textile materials by conventional dyeing techniques. The novel azo compounds are superior to structurally similar, but chemically distinct, compounds when used as dyes on the described textile materials. For example, it has unexpectedly been found that the compounds of the invention have greater tinctorial power than those disclosed in U.S. Patent 3,042,648. We have also discovered that the azo compounds do not stain other synthetic fibers, such as nylon, as much as do structurally similar unquaternized compounds. This property is of importance to the dyer in dyeing fabric consisting of both acrylic or modacrylic fibers and another synthetic fiber such as nylon.

The alkyl and alkoxy groups that each of X, Y, and T can represent can be straight or branch chain alkyl or alkoxy of up to about 8 carbon atoms. Examples of such alkyl and alkoxy groups include methyl, ethyl, propyl, isopropyl, butyl, amyl, hexyl, 2-ethylhexyl, octyl, methoxy, ethoxy, butoxy, hexoxy, etc. Preferably, the alkyl and alkoxy group represented by X, Y, and T are lower alkyl or lower alkoxy. As used herein and below, the word "lower" denotes an alkyl moiety having up to about 4 carbon atoms.

Bromine and chlorine are examples of the halogen atoms that each of X, Y, and T can represent. The alkanolylamino groups that each of X and Y can represent can contain up to about 8 carbon atoms. Preferred alkanoylamino groups are the lower alkanoylamino groups such as, for example, acetamido, propionamido, butyramido, etc. Examples of the lower alkyl groups that R can represent are set forth above in the definition of X.

A preferred group of the novel azo compounds of the invention have the formula

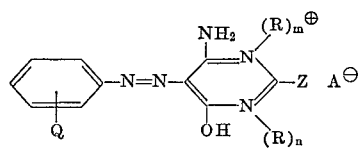

wherein Q represents lower alkyl, lower alkoxy, halogen, pyrrolidinono, succinimido, or lower alkanoylamino positioned ortho or para to the azo group, Z represents hydroxy or amino, R represents lower alkyl, especially methyl, $m$ and $n$ each represent 0 or 1, the sum of $m$ and $n$ being 1; and A is an anion.

As is well-known in the art of dyes, the basic color of the novel azo compound is attributable to the conjugated phenyl-azo-pyrimidine system. It is therefore readily apparent that the groups represented by X, Y, T, Q and Z, as defined above, do not materially affect the primary usefulness of the cations as dyes for the textile materials described above. These groups function primarily as auxochrome groups to control the shade of the cations.

The azo compounds of the invention are prepared according to conventional procedures using reactants that are well-known in the art. In general, the preparative scheme comprises diazotizing an aromatic amine having the formula

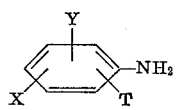

and coupling the diazotized amine with a pyrimidine compound having the formula

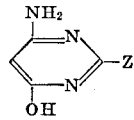

to yield the corresponding azo compound and then quaternizing the azo compound to yield the compounds of Formula I. Diazotization of the aromatic amine can be accomplished by reacting it with a solution of nitrous acid, prepared by adding an aqueous solution of sodium nitrite to a solution of the aromatic amine in dilute hydrochloric or sulfuric acid at reduced temperatures. Coupling of the diazotized aromatic amine and the pyrimidine compound can be carried out in a neutral to slightly alkaline medium. The azo compound obtained can then be treated with a quaternizing agent at an elevated temperature with or without a solvent. When a solvent is used, the preferred one is N-methylpyrrolidinone since the intermediate azo compounds are not readily soluble in the usual quaternization reaction solvents such as acetonitrile, chlorobenzene, toluene, and the like. As stated above, the reactants used to prepare the novel azo compounds are well-known in the art and can be prepared by known methods.

When the intermediate azo compound is quaternized, either of the ring nitrogen atoms of the pyrimidine ring can be alkylated. The azo compounds of the invention therefore consist of a mixture of two isomers and are used as such as dyes on the textile materials described above. In the subsequent examples, only one isomer is described. However, it is to be understood that the other isomer is obtained for each of the novel azo compounds of each example and that both isomers are within the scope of our invention.

Examples of the aromatic amines which can be used to prepare the novel compounds of the invention are N,p-amino-phenyl-2-pyrrolidinone, aniline, p-anisidine, p-toluidine, p - aminoacetanilide, 3,4 - dimethoxyaniline, o-chloroaniline, p-chloroaniline, 4-chloro-2-methylaniline, 2,5-diethoxyaniline, o-toluidine, 4-methoxy-2-nitroaniline, 4-methyl-2-nitroaniline, 2-methyl - 4 - nitroaniline, 2,5-dimethoxyaniline, N,p-aminophenylsuccinimide and the like. Illustrative of the pyrimidine coupling components are 2,4-diamino-6-hydroxypyrimidine and 2,4-dihydroxy-6-aminopyrimidine, commonly called aminouracil, both of which are well-known compounds.

The anions represented by A, such as, for example, CL$^-$, Br$^-$, I$^-$, CH$_3$SO$_4^-$, C$_6$H$_5$SO$_3^-$, etc., depends upon the method of preparation utilized and the particular quaternizing agent employed. The anion does not affect the usefulness of the azo cations of the invention as dyes nor does it affect the dye affinity of the cations for polyacrylonitrile textile materials. When the cations are used to dye polyacrylonitrile textile material, the anion becomes associated with a positively charged ion derived from the polyacryonitrile and is removed from the dye cation and polyacrylonitrile textile material, either in the dye bath or in a subsequent washing of the dyed polyacrylonitrile textile material. The cation of a cationic azo dye is responsible for the color of the compound and the particular anion associated with the cation is not important.

Suitable quaternizing agents that can be used in preparing the novel azo compounds of the invention are the dialkyl sulfates, the alkyl halides, the aralkyl halides, the alkyl esters of aryl sulfonic acids, etc. Specific quaternizing agents include, for example, dimethyl sulfate, diethyl sulfate, ethyl bromide, methyl iodide, ethyl iodide, benzyl chloride, benzyl bromide, methyl-p-toluene sulfonate, ethyl-p-toluene sulfonate and ethyl benzene sulfonate.

The following examples will serve to illustrate the preparation of representative azo compounds of the invention.

EXAMPLE 1

The azo compound (1.0 g.) prepared from N,p-aminophenyl-2-pyrrolidinone and 2,4-diamino-6-hydroxypyrimidine is dissolved in boiling N-methylpyrrolidinone (15 ml.), allowed to cool to 100° C. and treated with dimethylsulfate (1.0 ml.). The solution is heated for one hour at 95–100° C. and then drowned in ether. After one hour's standing, the ether is decanted and the residue taken up in hot water (50 ml.), filtered and treated with potassium iodide. The product is collected, washed with water and dried at room temperature. The cation obtained in parts fast yellowish-orange shades to acrylic fibers and has the following formula:

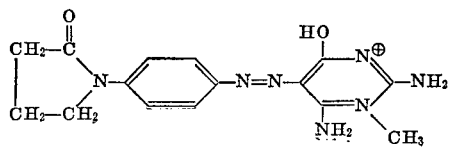

EXAMPLE 2

The azo compound (0.5 g.) prepared from aniline and 2,4-diamino-6-hydroxypyrimidine is heated in dimethylsulfate (10 ml.) at 95–100° C. for four hours. The yellow solution is drowned in ether, the precipitated solid collected on a funnel, washed with ether and then dissolved in water. After filtering, the product is reprecipitated as the iodide by addition of solid sodium iodide. This cation imparts yellow shades to acrylic fibers and has the following formula:

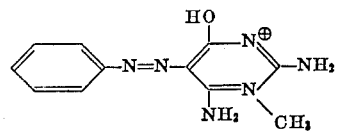

EXAMPLE 3

The azo compound (0.5 g.) from p-anisidine and 2,4-diamino-6-hydroxypyrimidine is treated exactly as described in Example 2. The resulting cation imparts yellow shades to acrylic fibers and has the following formula:

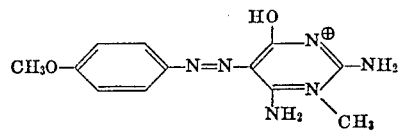

EXAMPLE 4

The azo compound (1.0 g.) from N,p-aminophenylpyrrolidinone and aminouracil is dissolved in N-methylpyrrolidinone (15 ml.) at the boil. The solution is filtered while still hot and the filtrate treated with dimethylsulfate (1.0 ml.). After heating for one hour on the steam bath, water (50 ml.) is added and the solution allowed to heat for a short time. Hydrochloric acid (4.0 ml.) is added and the quaternary chloride precipitated on cooling. The product is collected on a funnel, washed with a small amount of water and air dried. This cation imparts yellowish-orange shades to acrylic fibers and has the following structure:

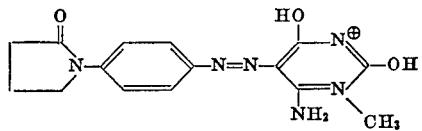

EXAMPLE 5

The azo compound (1.5 g.) prepared from p-toluidine and 2,4-diamino-6-hydroxypyrimidine is heated in methyl-p-toluene-sulfonate (20 ml.) at 95–100° C. for twenty-four hours. The yellow solution is drowned in ether with good stirring, the ether decanted and the residue dissolved in hot water. After filtering hot the cation is precipitated by addition of sodium chloride and zinc chloride. This cation imparts yellow shades to acrylic fibers and has the following structure:

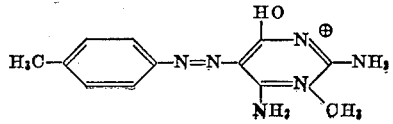

The cations set forth in the following examples are prepared by the procedure described in the preceding examples and conform to the general formula

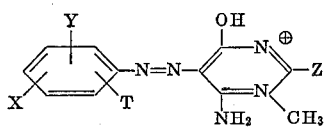

| Example No.: | T | X | Y | Z | Color on Acrylic Fibers |
|---|---|---|---|---|---|
| 6 | H | 4-COCH₃ | H | —NH₂ | Reddish-yellow. |
| 7 | H | 4-COCH₃ | H | —OH | Do. |
| 8 | 3-OCH₃ | 4-OCH₃ | H | —OH | Do. |
| 9 | 3-OCH₃ | 4-OCH₃ | H | —NH₂ | Do. |
| 10 | 2-Cl | H | H | —NH₂ | Yellow. |
| 11 | 2-Cl | H | H | —OH | Do. |
| 12 | H | 4-Cl | H | —OH | Do. |
| 13 | H | 4-Cl | H | —NH₂ | Do. |
| 14 | 2-CH₃ | 4-Cl | H | —NH₂ | Do. |
| 15 | 2-CH₃ | 4-Cl | H | —OH | Do. |
| 16 | 2-OC₂H₅ | 5-OC₂H₅ | H | —OH | Orange. |
| 17 | 2-OC₂H₅ | 5-OC₂H₅ | H | —NH₂ | Do. |
| 18 | 2-CH₃ | H | H | —NH₂ | Yellow. |
| 19 | 2-CH₃ | H | H | —OH | Do. |
| 20 | 2-NO₂ | 4-OCH₃ | H | —OH | Yellowish-orange. |
| 21 | 2-NO₂ | 4-OCH₃ | H | —NH₂ | Do. |
| 22 | 2-NO₂ | 4-CH₃ | H | —NH₂ | Yellow. |
| 23 | 2-NO₂ | 4-CH₃ | H | —OH | Do. |
| 24 | 2-CH₃ | 4-NO₂ | H | —NH₂ | Do. |
| 25 | 2-CH₃ | 4-NO₂ | H | OH | Do. |
| 26 | 2-OCH₃ | 5-OCH₃ | H | OH | Orange. |
| 27 | 2-OCH₃ | 5-OCH₃ | H | NH₂ | Do. |
| 28 | H | 4-succinimido | H | NH₂ | Do. |
| 29 | H | 4-succinimido | H | OH | Do. |
| 30 | 2-NO₂ | 4-NO₂ | 6-Cl | OH | Yellowish-orange. |
| 31 | 2-NO₂ | 4-NO₂ | 6-Cl | NH₂ | Do. |

The azo compounds of the invention can be used for dyeing acrylic and modacrylic polymer fibers, yarns and fabrics giving yellow shades when applied thereto by conventional dye methods. Acrylic textile materials are those which consist of at least 85% acrylonitrile and modacrylic textile materials are those consisting of at least 35% but less than 85% acrylonitrile. The cations of the invention also give excellent dyeings on acid-modified acrylic textile materials such as the sulfonate modified acrylic fibers described in U.S. Patents 2,837,500, 2,837,501 and 3,043,811. The novel compounds can also be used to dye sulfonate modified polyester fibers such as are described in U.S. Patent 3,018,272. Examples of the textile materials that are dyed with the compounds of the invention are those sold under the tradenames "Orlon," "Orlon 42," "Verel," "Acrilan," "Dynel," "Creslan" and "Dacron 64." In general, the compounds, when used as dyes on the described textile materials, exhibit excellent fastness, for example, to washing, to alkaline perspiration, gas (atmospheric fumes) and light.

As described above, the novel azo compounds are characterized by a structure which renders them chemically distinct from other known compounds. This distinctive structure imparts unexpected properties to the present compounds, especially when they are used as dyes for dyeing acrylic and modacrylic textile materials, including affinity for acrylic fibers, and satisfactory brightness and fastness to light. Thus, we have found the compounds of the invention to possess excellent fastness properties when used as dyes on acrylic and modacrylic textile materials when such dyeings are tested by methods such as described in the A.A.T.C.C. Technical Manual, 1965 edition.

Textile materials dyed by the compounds of the invention are characterized by containing at least about 35% combined acrylonitrile units and up to about 95% acrylonitrile units, and modified, for example, by 65–5% of vinyl pyridine units as described in U.S. Patents 2,990,393 (Re. 25,533) and 3,014,008 (Re. 25,539) or modified by 65–5% of vinylpyrrolidone units, for example, as described by U.S. Patent 2,970,783, or modified with 65–5% acrylic ester or acrylamide units as described in U.S. Patents 2,879,253, 2,879,254 and 2,838,470. Similar amounts of the other polymeric modifiers mentioned above are also useful. A preferred group of the copolymers readily dyeable with the compounds of the invention are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

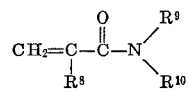

wherein $R^8$ is selected from the group consisting of hydrogen and methyl, and $R^9$ and $R^{10}$ are selected from the group consisting of hydrogen and alkyl groups of 1–6 carbon atoms, (2) copolymers consisting of at least two of said acrylamidic monomers, and (3) copolymers consisting of at last 50% by weight of at least one of said acrylamidic monomers and not more than 50% by weight of a polymerizable monovinyl pyridine monomer.

Another type of modacrylic polymer that can be dyed with the compounds of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R^8$, $R^9$ and $R^{10}$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one technique by which the compounds of the invention can be used to dye acrylonitrile polymer textile material.

An amount of 0.1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile materials, the dyeing is carried out at the boil for one hour. In the case of materials made of "Verel" modacrylic fiber the dyebath temperature should not exceed 90° C. in order to avoid damage to the fiber. The dyed material is then washed well with water and dried.

We claim:
1. An azo compound having the formula

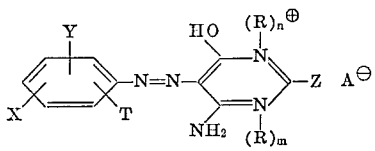

wherein:
X=hydrogen, lower alkyl, lower alkoxy, chlorine, bromine, nitro, pyrrolidinono, succinimido or lower alkanoylamino;
Y=hydrogen, lower alkyl, lower alkoxy, chlorine, bromine, nitro, or lower alkanoylamino;
T=hydrogen, lower alkyl, lower alkoxy, chlorine, or bromine;
Z=hydroxy or amino;
R=lower alkyl or benzyl;
$m$ and $n$ each represent 0 or 1, the sum of $m$ and $n$ being 1; and
A=an anion.

2. An azo compound according to claim 1 having the formula

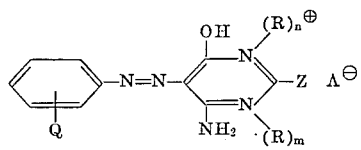

wherein:
Q=hydrogen, lower alkyl, lower alkoxy, chlorine, bromine, pyrrolidinono, succinimido, or lower alkanoylamino positioned ortho or para to the azo group;
Z=hydroxy or amino;
R=lower alkyl;
$m$ and $n$ each represent 0 or 1, the sum of $m$ and $n$ being 1; and
A=an anion.

3. An azo compound according to claim 2 having the formula

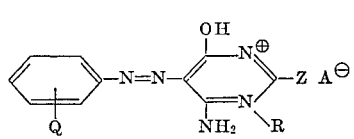

wherein:
Q=hydrogen, lower alkyl, lower alkoxy, pyrrolidinono, or succinimido;
Z=hydroxy or amino;
R=lower alkyl; and
A=an anion.

4. An azo compound according to claim 3 having the formula

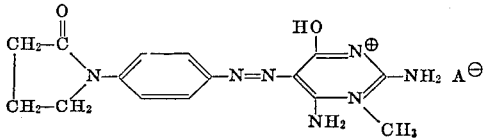

wherein A is an anion.

5. An azo compound as defined in claim 3 having the formula

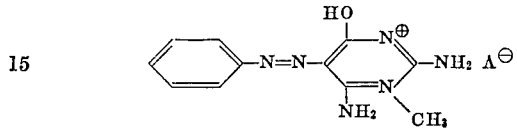

wherein A is an anion.

6. An azo compound as defined in claim 3 having the formula

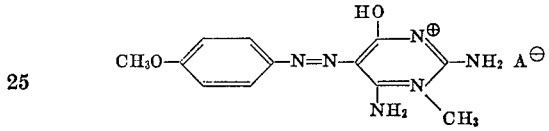

wherein A is an anion.

7. An azo compound as defined in claim 3 having the formula

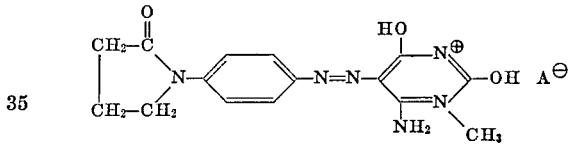

wherein A is an anion.

8. An azo compound as defined in claim 3 having the formula

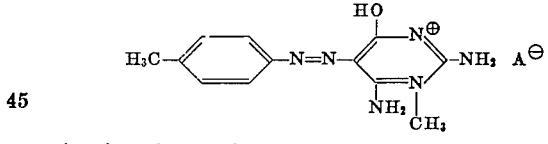

wherein A is an anion.

References Cited

UNITED STATES PATENTS

| | | | |
|---|---|---|---|
| 2,746,951 | 5/1956 | Taube | 260—154 |
| 2,980,678 | 4/1961 | Langley | 260—154 XR |
| 3,256,282 | 6/1966 | Reicheneder et al. | 260—154 XR |
| 3,374,220 | 3/1968 | Kremer et al. | 260—154 |

FOREIGN PATENTS 1,378,853 10/1964 France.

OTHER REFERENCES

Israel et al., Index Chemicas, volume 22, 68979 (1966).

FLOYD D. HIGEL, Primary Examiner

U.S. Cl. X.R.

8—4, 41; 117—138.8; 260—37, 41, 256.4, 326, 326.5